(12) United States Patent
Watson et al.

(10) Patent No.: US 7,466,054 B2
(45) Date of Patent: Dec. 16, 2008

(54) AERODYNAMIC INSERT FOR HIGH SPEED PERMANENT MAGNET MOTOR

(75) Inventors: Andrew P. Watson, Export, PA (US); Kevin L. Tapper, Greensburg, PA (US)

(73) Assignee: Canopy Technologies, LLC, Jeannette, PA (US)

( * ) Notice: Subject to any disclaimer, the term of this patent is extended or adjusted under 35 U.S.C. 154(b) by 411 days.

(21) Appl. No.: 11/407,839

(22) Filed: Apr. 20, 2006

(65) Prior Publication Data

US 2007/0247013 A1    Oct. 25, 2007

(51) Int. Cl.
*H02K 1/27* (2006.01)
*H02K 1/28* (2006.01)

(52) U.S. Cl. .............. 310/156.08; 310/51; 310/156.09; 310/218

(58) Field of Classification Search ............. 310/51, 310/156.08–156.09, 156.12–156.14, 156.18–156.25, 310/156.29–156.31, 156.48, 156.55, 156.59, 310/156.61, 156.63, 216–218, 261

See application file for complete search history.

(56) References Cited

U.S. PATENT DOCUMENTS

| | | | |
|---|---|---|---|
| 3,427,486 A | 2/1969 | Whitney | |
| 3,885,177 A | 5/1975 | Phelon et al. | |
| 4,179,634 A * | 12/1979 | Burson | 310/153 |
| 4,332,079 A | 6/1982 | Silver | |
| 4,700,096 A | 10/1987 | Epars | |
| 4,973,872 A * | 11/1990 | Dohogne | 310/156.28 |
| 5,828,152 A | 10/1998 | Takeda et al. | |
| 5,952,755 A | 9/1999 | Lubas | |
| 6,548,932 B1 | 4/2003 | Weiglhofer et al. | |
| 6,603,232 B2 | 8/2003 | Van Dine et al. | |
| 6,661,133 B2 | 12/2003 | Liebermann | |
| 6,700,288 B2 | 3/2004 | Smith | |
| 6,740,993 B2 | 5/2004 | Greubel et al. | |
| 6,750,580 B2 * | 6/2004 | Lai et al. | 310/156.28 |
| 6,750,584 B2 | 6/2004 | Smith | |
| 6,847,145 B2 | 1/2005 | Van Dine et al. | |
| 6,919,663 B2 | 7/2005 | Iles-Klumpner | |
| 6,933,645 B1 * | 8/2005 | Watson | 310/156.09 |
| 7,205,695 B2 * | 4/2007 | Smith | 310/218 |
| 7,358,637 B2 * | 4/2008 | Tapper | 310/156.08 |

FOREIGN PATENT DOCUMENTS

JP            56062055 A * 5/1981

* cited by examiner

*Primary Examiner*—Tran Nguyen
(74) *Attorney, Agent, or Firm*—The Webb Law Firm

(57) ABSTRACT

An insert comprising a lightweight structure configured for filling the gaps between axially spaced C-shaped lamination stacks and circumferentially spaced non-magnetic cradles on a permanent magnet rotor. The insert is secured to a rib by a dovetail tongue that fits within a dovetail groove provided along the length of each rib. The insert engages the adjacent cradles and has a circumferential surface that has the same radius of curvature as the top surface of the cradles.

2 Claims, 4 Drawing Sheets

AERODYNAMIC INSERT FOR HIGH SPEED PERMANENT MAGNET MOTOR

BACKGROUND OF THE INVENTION

1. Field of the Invention

This invention pertains to high speed, high power permanent magnet electric motors or generators and, in particular, to inserts for installation on the outer surface of the motors or generators for decreasing the windage losses and noise.

2. Description of Related Art

U.S. Pat. No. 6,933,645 entitled "Permanent Magnet Rotor and Magnet Cradle" describes a novel permanent magnet rotor construction for a permanent magnet motor or generator. The rotor assembly comprises a non-magnetic cylindrical shaft having an axis of rotation and a generally cylindrical surface. An even number of recessed and overhung slots in the cylindrical surface define an even number of ribs. C-shaped high magnetic permeability lamination stacks surround the ribs. A permanent magnet is positioned in each recessed slot. The magnets have spaced circumferential end edge faces abutting the lamination stacks. The magnets are magnetized with opposite poles at each circumferential end edge face arranged so that the poles abutting any C-shaped lamination stack are of identical polarity. Non-magnetic cradles support the permanent magnets in the recessed slots. The cradles have axial end walls that bear directly upon the ribs to secure the magnets against centrifugal force.

The rotor described in the preceding paragraph has been found to have excellent characteristics and the cradle design permits an easy assembly. Axial rows of C-shaped lamination stacks are installed on the ribs around one axial section of the rotor by sliding them onto the overhung ribs. Layered permanent magnets are then stacked in cradles and the cradles are slid axially between the C-shaped laminations. This process is repeated until the entire rotor is populated with laminations and magnets. Unfortunately, the fact the axial end walls of the cradles must bear directly upon the ribs leaves a gap between adjacent C-shaped laminations resulting in an uneven assembled rotor surface which results in windage losses.

SUMMARY OF THE INVENTION

It is an advantage, according to this invention, to provide a non-magnetic inserts for filling the gap between adjacent C-shaped laminations and a structure for securing the inserts to the non-magnetic ribs in a way that will not interfere with the magnetic properties of the rotor.

Briefly, according to this invention, there is provided an aerodynamic insert for a permanent magnet rotor assembly comprising a non-magnetic cylindrical shaft having an axis of rotation and a generally cylindrical surface. An even number of recessed and overhung slots in the cylindrical surface define an even number of ribs. A plurality of generally C-shaped high-magnetic permeability laminated stacks surrounds the ribs. Each laminated stack abuts overhung portions of the ribs. A permanent magnet is positioned in each recessed slot. The magnets have spaced circumferential end edge faces abutting the laminated stacks. The magnets have top and bottom faces. The magnets are magnetized with opposite poles at each circumferential end edge face such that the poles abutting any C-shaped lamination stack are of identical polarity.

A plurality of non-magnetic cradles supports the permanent magnets in the recessed slots. Each cradle has top and bottom walls abutting the top and bottom faces of the permanent magnets and each cradle has axial end walls with circumferential edges of the axial end walls directly abutting overhung portions of the ribs. The total axial length of the top face of the cradles in the axial direction is greater than the total axial length of the lamination stacks and magnets permitting the laminated stacks and magnets to fit between the end walls of the cradle. The magnets are secured against centrifugal force by the cradles bearing directly on the ribs.

Non-magnetic inserts fill the gap between axially spaced C-shaped laminations and circumferentially-spaced cradles and have an outer surface that has a radius of curvature matching the radius of curvature of the top wall of the cradles. The inserts have a dovetail-shaped tongue opposite the top wall that slides within a dovetail groove in the outermost face of the ribs running the axial length of the ribs. The inserts span the circumferential space between two circumferentially-spaced cradles and engages the cradles to hold the ends of the inserts from radial outward bending.

Preferably, the inserts are configured to minimize volume and weight so as to minimize stress on the rotor ribs and cradles.

BRIEF DESCRIPTION OF THE DRAWINGS

Further features and other objects and advantages will become clear from the following detailed description made with reference to the drawings in which.

DESCRIPTION OF THE PREFERRED EMBODIMENTS

Figure 1:
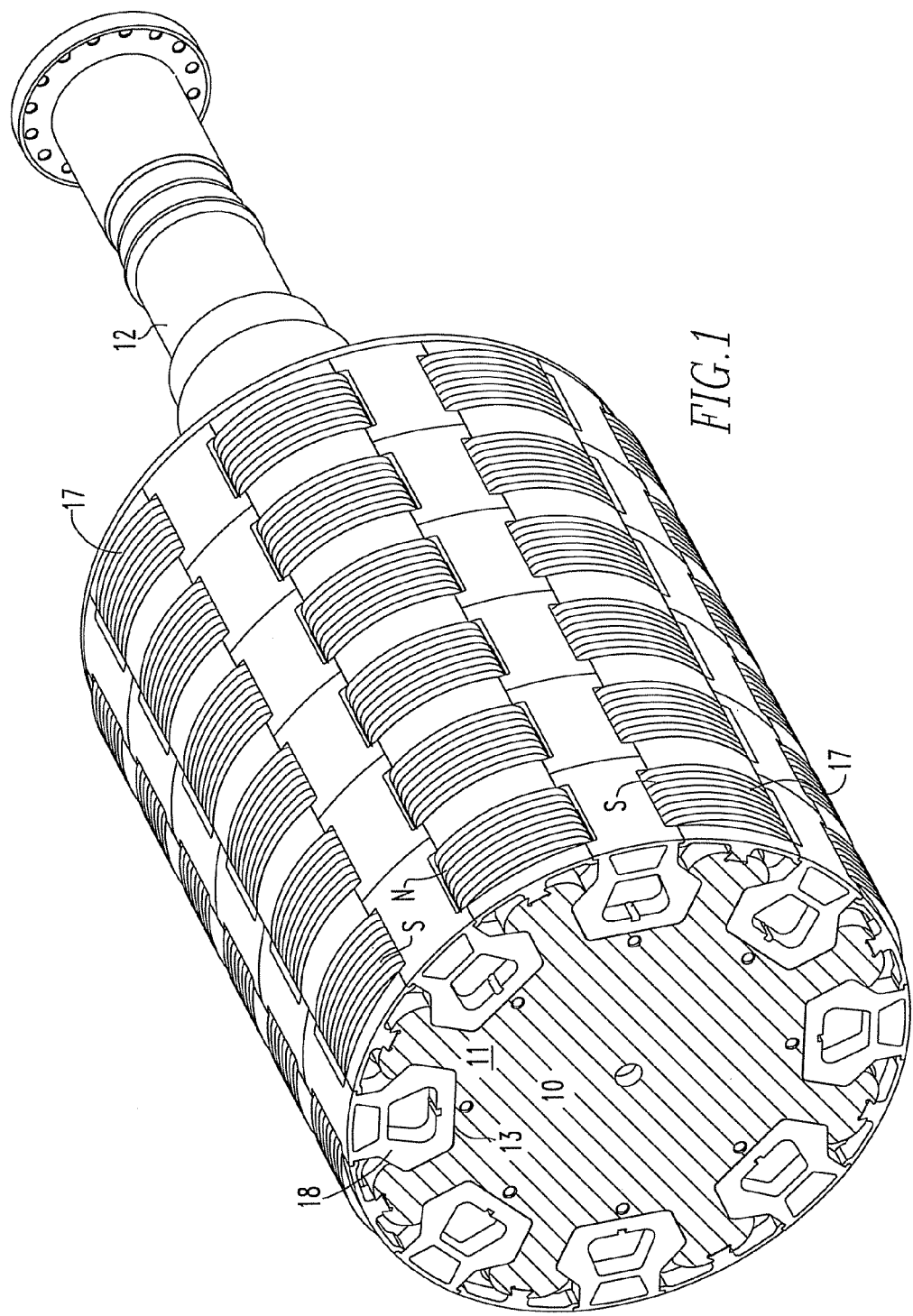
FIG. 1 is a perspective view of an assembled rotor sectioned by a plane perpendicular to the axis of the rotor.

Referring to FIG. 1, the shaft 10 comprises the foundation of the permanent magnet rotor according to this invention. The shaft 10 is made of non-magnetic high strength material, such as nickel cobalt alloy. The shaft 10 has an interrupted cylindrical surface defined relative to the rotational axis of the rotor. At each end of the shaft, provisions are made for bearings 12. The bearings 12 establish the rotational axis of the rotor. The shaft 10 has an even number of substantially identical recessed and overhung slots 13. The overhung slots 13 define substantially identical generally T-shaped ribs 11 with dovetail surfaces 15 adjacent the slots. The magnets 20, as will be explained, are positioned within the slots held by non-magnetic cradles.

Figure 2:
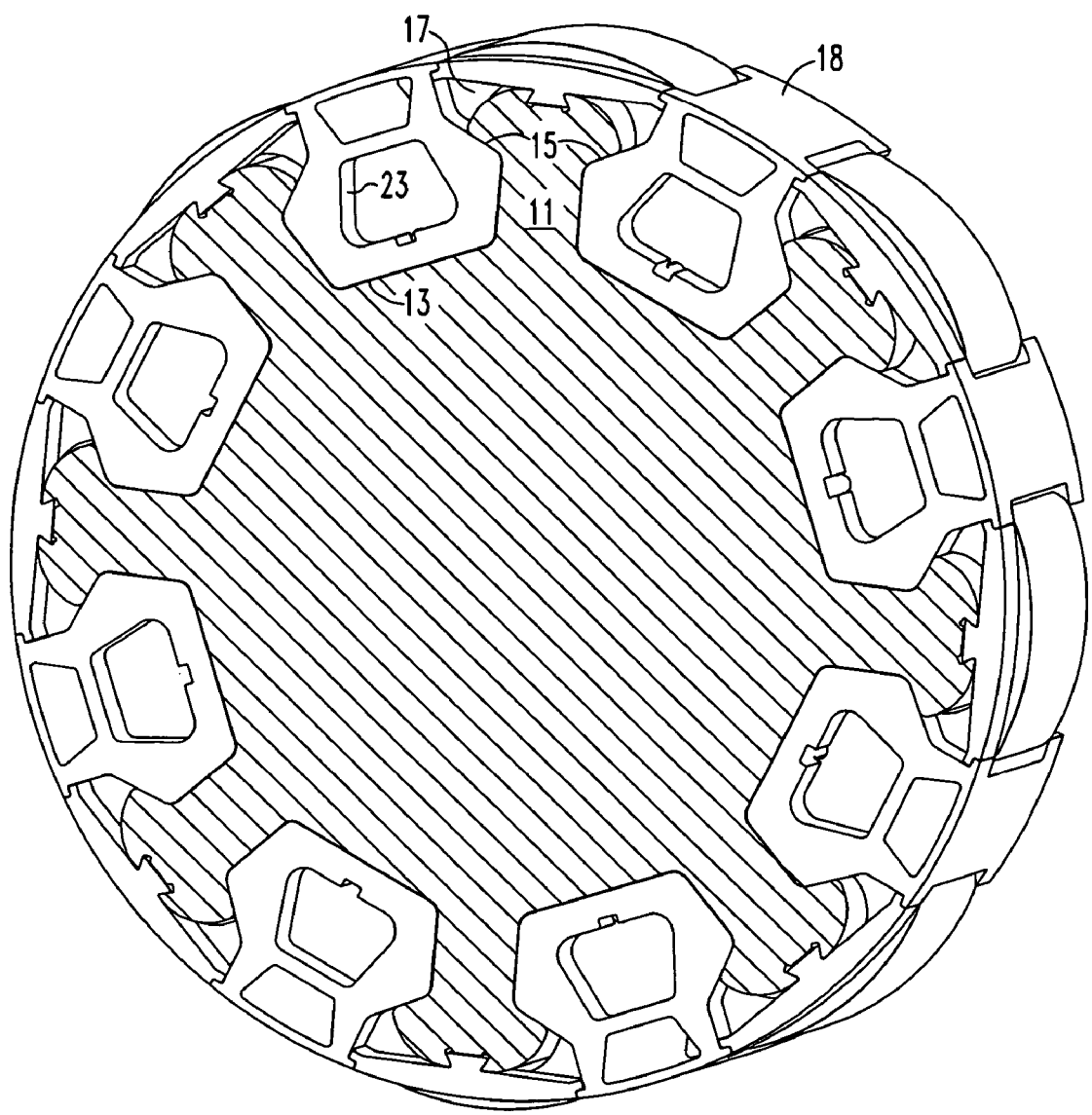
FIG. 2 is an assembled perspective view of an assembled slice of the rotor shaft.
Figure 3:
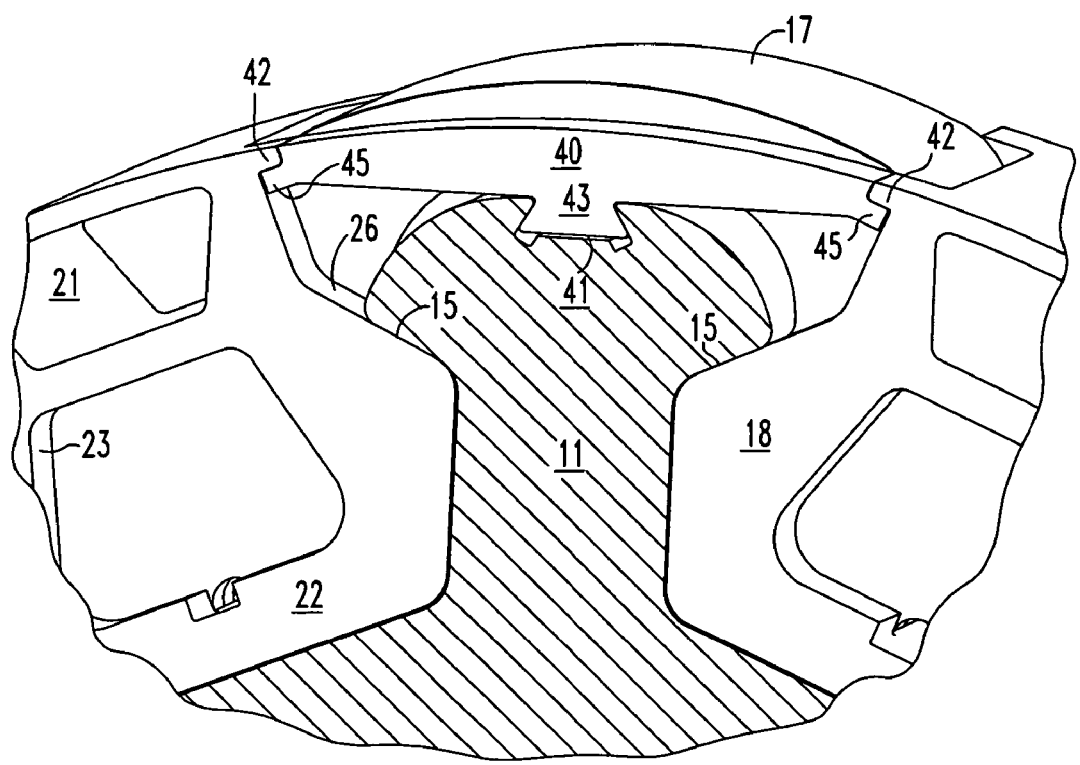
FIG. 3 is a broke out detail of FIG. 2.
Figure 4:
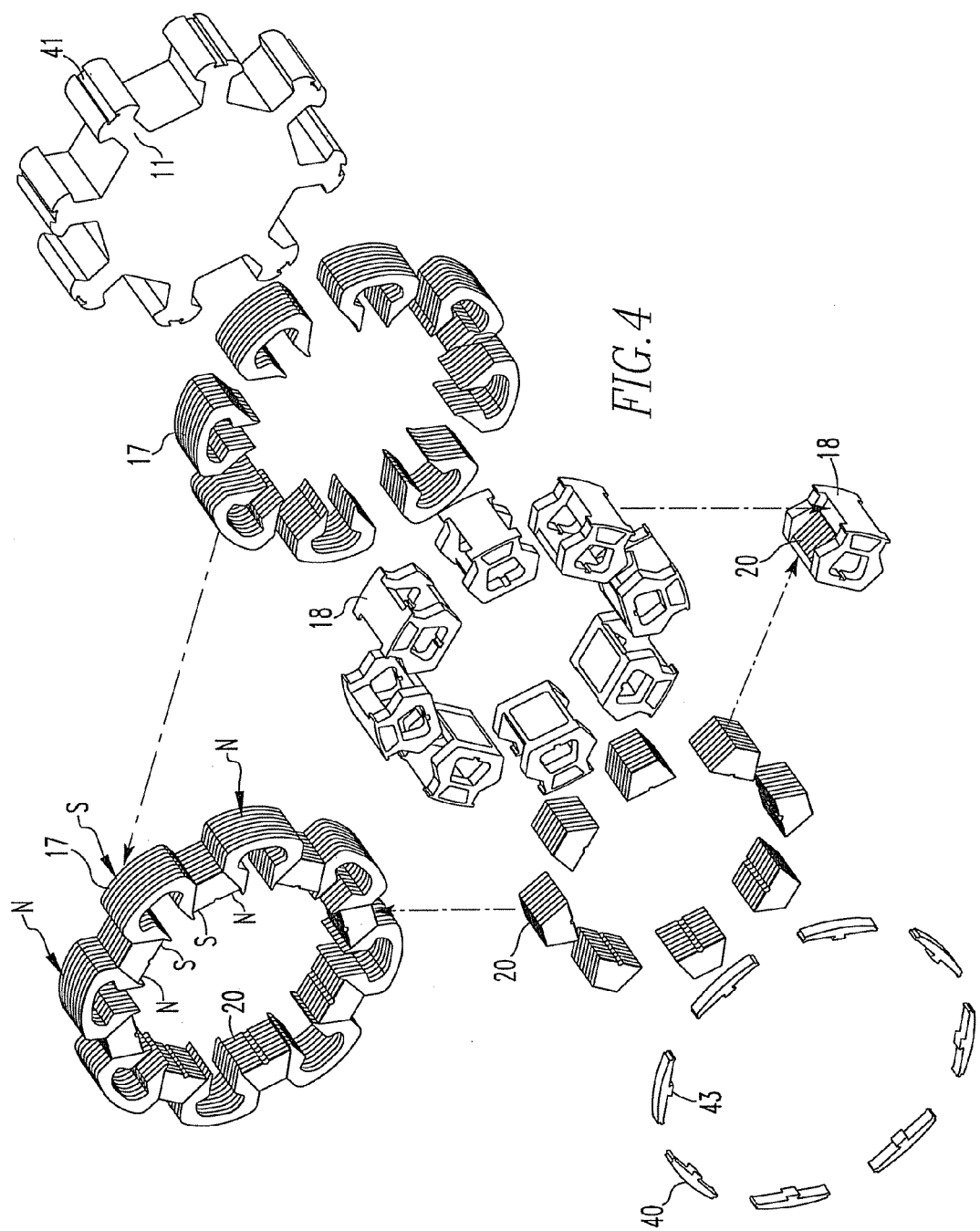
FIG. 4 is an exploded perspective view of a slice of the rotor shaft.

While the shaft 10 has a continuous cross section (extending axially) in the vicinity of the magnets, it is helpful to consider the shaft in individual sections supporting an even number of magnets. FIG. 2 illustrates such a section broken out of the shaft and FIG. 4 is an exploded view of FIG. 2 except the shaft.

A plurality of generally C-shaped lamination stacks 17 comprised of high-magnetic permeability material, such as electrical steel, surrounds the T-shaped ribs 11 as is seen in FIG. 1. The stacks are made up of individual sheets positioned perpendicular to the axis of rotation of the shaft. The sheets have edges that abut the overhung or dovetail surface 15 of the ribs. In this way, the lamination stacks 17 are mechanically secured to resist centrifugal forces when the shaft rotates.

A plurality of non-magnetic cradles 18 for holding permanent magnets is positioned in each slot. Each cradle 18 carries laminated permanent magnets 20. Each cradle 18 has a hollow top wall 21 and a bottom wall 22. These walls generally lie in the axial and circumferential directions when the cradle is installed in a slot on the rotor. The portion of the hollow top wall 21 nearest the axis of the rotor abuts the magnets and resists the centrifugal force tending to throw out the magnets when the rotor rotates. The cradles 18 are formed of lightweight non-magnetic structural material, such as titanium. The top wall 21 is hollowed out to reduce weight. The cradles have axial end walls 23 joined to the top and bottom walls. The bottom wall 22 secures the axial end walls 23 so that they do not collapse on the magnets when the top wall 21 is urged radially outward at high rotation speeds. The axial end walls 23 have edges 26 that are configured to abut the dovetail surface 15 of the ribs. The space between the axial end walls of the cradles is large enough to span the axial length of the magnets and also the axial length of the laminated stacks. Preferably, the axial length of the magnets and the laminated stacks is identical. The cradles are secured against centrifugal force by the engagement of the dovetail surfaces on the cradles and the overhung ribs. It is important to note that centrifugal force exerted by the cradle is applied to the ribs.

The magnets are typically rare earth permanent magnets. The magnets are magnetized with opposite poles at each circumferential edge face. The poles abutting any C-shaped lamination stack are of the same polarity. The portion of the lamination stack directly over each rib is a magnetic pole of the rotor. Note that no non-magnetic material is placed over the surface of the rotor and, therefore, the rotor poles can more closely approach stator windings for more efficient coupling.

An improvement, according to this invention, is an aerodynamic insert 40 that interconnects with the rib and the adjacent cradles to provide a smooth circumferential surface in the gap between adjacent cradles and adjacent lamination stacks. The top circumferential surfaces of the ribs are provided with dovetailed grooves 41 extending the axial length of the rotor. The cradles are provided with an overhung lip 42 at each circumferential end of the top wall 21. The insert is configured with a dovetailed tongue 43 that slides within the dovetailed groove 41 for securing the insert against centrifugal motion. Because of the span between the cradles, the circumferential ends have a lip that slides beneath the overhung lip 42 of adjacent cradle. The radially outer surface of the insert has a radius of curvature that matches the radius of curvature of the outer surface of the top wall 21 of the adjacent cradles. The axial thickness of the insert is just sufficient to fill the gap between the axially spaced C-shaped lamination stacks.

The curved outer surface of the insert matching the curvature of the cradle end wall makes for an aerodynamic surface. The same effect could be accomplished by circumferentially extending the non-magnetic metal cradle end wall, but the added weight would add to the peak stress area on the rotor poles. This would limit the safe speed of rotation. The inserts are designed to minimize weight. The material requirements for the inserts are lightweight, stiff, and non-magnetic material, such as Titanium.

The inserts, according to this invention, reduce aerodynamic turbulence by smoothing the surface between magnet cradles on high speed, high power permanent magnet rotors. The reduction in turbulence reduces windage losses, increases motor efficiency, and reduces heat build-up. The reduced heat build-up prevents reduction in rotor magnet field strength and the permanent magnets are temperature sensitive. Finally, the inserts reduce noise levels while the rotor is being rotate.

Having thus defined our invention in the detail and particularity required by the Patent Laws, what is desired protected by Letters Patent is set forth in the following claims.

The invention claimed is:

1. A permanent magnet rotor assembly comprising:
   a non-magnetic cylindrical shaft having an axis of rotation and a generally cylindrical surface with an even number of recessed and overhung slots defining an even number of ribs therebetween;
   a plurality of generally C-shaped high magnetic permeability laminated stacks surrounding said ribs, each C-shaped laminated stack abutting overhung portions of the ribs;
   a plurality of permanent magnets positioned in each recessed slot, said magnets having spaced circumferential end edge faces abutting the C-shaped laminated stacks and said magnets having top and bottom faces, said magnets being magnetized with opposite poles at each circumferential end edge face and such that the poles abutting any C-shaped lamination stack are of identical polarity;
   a plurality of non-magnetic cradles for supporting the permanent magnets in the recessed slots, each cradle having top and bottom walls abutting the top and bottom faces of the permanent magnets and each cradle having axial end walls with circumferential edges of said axial end walls directly abutting overhung portions of the ribs, the total axial length of the top wall of the cradles in the axial direction being greater than the total axial length of the C-shaped lamination stacks and magnets permitting the C-shaped laminated stacks and magnets to fit between the end walls of the cradle, said magnets being secured against centrifugal force by the cradles bearing directly on the ribs; and
   a plurality of inserts filling the gaps between axially spaced C-shaped lamination stacks and circumferentially spaced non-magnetic cradles, said inserts being secured to the ribs by a dovetail tongue that fits within a dovetail groove provided along the length of each rib, said inserts engaging the adjacent cradles and having a circumferential surface that has the same radius of curvature of the top surface of the cradles.

2. An aerodynamic insert for a permanent magnet rotor assembly which assembly comprises:
   a non-magnetic cylindrical shaft having an axis of rotation and a generally cylindrical surface with an even number of recessed and overhung slots defining an even number of ribs therebetween;
   a plurality of generally C-shaped high magnetic permeability laminated stacks surrounding said ribs, each C-shaped laminated stack abutting overhung portions of the ribs;
   a plurality of permanent magnets positioned in each recessed slot, said magnets having spaced circumferential end edge faces abutting the C-shaped laminated stacks and said magnets having top and bottom faces, said magnets being magnetized with opposite poles at each circumferential end edge face and such that the poles abutting any C-shaped lamination stack are of identical polarity; and
   a plurality of non-magnetic cradles for supporting said permanent magnets in the recessed slots, each cradle having top and bottom walls abutting the top and bottom faces of said permanent magnets and each cradle having axial end walls with circumferential edges of said axial end walls directly abutting overhung portions of the ribs, the total axial length of the top wall of the cradles in the axial direction being greater than the total axial length of the C-shaped lamination stacks and magnets permitting the C-shaped laminated stacks and magnets to fit between the end walls of the cradle, said magnets being secured against centrifugal force by the cradles bearing directly on the ribs; and said insert comprising a lightweight structure configured for filling the gaps between axially spaced C-shaped lamination stacks and circumferentially spaced non-magnetic cradles, said insert being secured to a rib by a dovetail tongue that fits within a dovetail groove provided along the length of each rib, said insert engaging the adjacent cradles and having a circumferential surface that has the same radius of curvature as the top surface of the cradles.

* * * * *